United States Patent [19]

Howard

[11] 3,916,607
[45] Nov. 4, 1975

[54] ROTARY BLADE RAKE

[76] Inventor: Orvel Howard, P.O. Box 222, 401 W. 12th St., Rock Falls, Ill. 61071

[22] Filed: Apr. 18, 1974

[21] Appl. No.: 462,048

[52] U.S. Cl. .................... 56/17.5; 56/295; 56/367; 56/193; 172/42
[51] Int. Cl.² ......................................... A01D 35/26
[58] Field of Search ............ 56/17.5, 193, 295, 255; 172/42

[56] References Cited
UNITED STATES PATENTS

| | | | |
|---|---|---|---|
| 3,117,633 | 1/1964 | Hosek | 172/42 |
| 3,611,691 | 10/1971 | Howard | 56/367 |
| 3,742,688 | 7/1973 | Tonjes, Jr. | 56/193 |
| 3,753,338 | 8/1973 | Sherratt | 56/17.5 |

*Primary Examiner*—Russell R. Kinsey

[57] ABSTRACT

In a preferred embodiment of the invention there is provided a rotary blade combination in the nature of a rake-accessory, including the rotary blade having opposite end portions thereof with its upper and lower flat faces perforated by two pairs of substantially parallel-spaced apertures, the pair of apertures being located with the first one thereof about centrally between leading and following edges of the blade, and the second thereof being in juxtaposition to the following edge of the blade, and mounted in the apertures there being the rake tine tooth, one rake tine tooth per pair of apertures with the tine tooth extending through the blade trailing edge aperture extending downwardly therethrough, from above to below the blade, and having an upper end of the tine tooth bent forwardly angularly with a terminal end thereof forming an annulus with the through-space of the annulus being aligned with the blade portion's centrally located aperture of the pair of apertures, with the lower end of the tine tooth extending angularly downwardly and rearwardly from the lower face of the blade portion through which it extends, there being a pair of tine teeth on each of opposite ends of the blade, and the blade being rotatably mountable in typically a conventional manner, each of the tine teeth being secured to the blade detachably by a bolt and nut therefor with the threaded shaft of the bolt extending downwardly through the central aperture after extending through the annular space of the tine tooth with the bolt end being securely anchored beneath the blade surface by the nut, thus anchoring the tine tooth between the blot head and the upper surface of the blade portion.

9 Claims, 4 Drawing Figures

ROTARY BLADE RAKE

The present invention is directed to an improved rotary lawn mower rake as a part of a rotary blade.

BACKGROUND TO THE INVENTION

The present invention is an improvement on the invention already patented in U.S. Pat. No. 3,611,691 entitled RAKE ATTACHMENT FOR ROTARY POWER MOWER, the disclosure of which patent is incorporated hereinto by reference in its entirety as a part of the present invention disclosure. With the rotary blade rake of that patent, in the use of the manufactured structure evidenced the presence of particular problems. For example, the plates utilized in that particular patented invention, were cumbersome and heavy and costly or expensive insofar as both materials and the making of the plates, and the presence thereof as mounted on the underside of the blade as was necessary for the securing of the tine teeth thereof caused a down-draft of air circulation as the rotary blade rotated at about 2000 rpm, which down-draft interfered with the cutting, raking and picking-up functions of the rotary blade and the tine teeth particularly when the grass was high and/or damp or wet, there being a tendency for the cut grass to be thrown outwardly from under the lawn mower onto the yard rather than into the bag of the lawn mower normally functioning to collect the cut grass. Aside from the functional and cost problems, there was the problem of inflexibility of use of varying sizes and types of tine teeth in the absence of additional plates particularly designed to clamp and hold the alternate tine teeth, as well as design problems relating to the merchandizing as a result of the massive appearance and location of the tine-teeth-securing plates to which distributors objected, thereby rendering the invention less commercially acceptable because of the bulk thereof. Also, because of the relative inefficiency of the tine teeth in picking-up the cut grass as noted above, three such tine teeth were required side by side on each of opposite ends of the blade portion of the rotary blade.

SUMMARY OF THE INVENTION

Accordingly, objects of the present invention include the overcoming of difficultes and problems and disadvantages of the types discussed above.

In particular, an object of the present invention is to improve the updraft of the rotary blade for more effective cutting and raking of grasses, particularly the higher and/or damp types.

Another object is to reduce the amount of structural mass required in the mounting of tine teeth on the rotary blade end portion.

Another object is to obtain a novel rotary blade-tine tooth combination obtaining improved simplicity of securely mounting and appearance and cost and maintenance.

Another object is to improve the rake-blade joint structure such that alternate tine teeth of differing and varying sizes and dimensions may be substituted economically one for the other.

Another object is to obtain a novel mounting combination with the rotary blade and by the tine tooth, for securely anchoring the tine tooth to the blade end portion, while concurrently providing for improved durability of the tine tooth against shock, shearing, bending, and the like.

Other objects become apparent from the preceding and following disclosure.

One or more objects are obtained by the invention as defined herein.

Broadly the invention may be defined as a rotary blade-tine tooth combination in which the opposite ends of the rotary blade include each one or more pairs or sets of apertures spaced apart in a direction extending between leading and trailing edges of the blade end portion with one of the paired apertures being about centrally located between the leading and trailing edges, with the remaining aperture being located in substantially juxtaposition to the trailing edge, and with the tine teeth each being bent at an angle ranging from about 15° to about 65° degrees, typically at about a 50° angle as measured between the respective planes of the upper and lower portions of the bent tine tooth's longitudinal shaft axis, such that when the upper portion of the tine tooth is anchored through the terminal ends annularly defined eye and its upper terminal end eye aligned with the central aperture, with the upper portion extending substantially horizontally and flush to the upper face of the blade, the lower portion of the tine tooth extends angularly downwardly and rearwardly through the trailing edge aperture extending from the lower face of the end portion of the rotary blade and the lower portion of the tine tooth is preferably metal of a tempered spring metal, and is springable upwardly in a pivoted lever fashion about the hole structure as a fulcrum as well as being to some extent also springable upwardly through the trailing edge qperture by axial movement of the lower portion of the tine tooth through the rotary blade trailing edge aperture, thereby avoiding any substantial possibility of shearing the tine tooth by the striking of rocks or other foreign missiles during the rotation of the rotary blade. By the improved updraft obtained by the substantial avoidance of substantially large prior bulk, the number of raking tine teeth need be merely one or two, preferably two, with the present invention — rather than preferably at least three with the prior patented invention, on each end portion of the rotary blade. The sole mounting structure of the present invention is a bolt extending preferably from the top above the blade through the annular through-space or key defined in the tine tooth's upper portion terminal end and through the central blade tooth-mounting aperture, with preferably a nut mounted on the lower end of the threaded shaft below the lower face of the end portion of the rotary blade, thereby anchoring the tine tooth between the flange head of the bolt and the upper surface of the rotary blade.

By the provision of such structure, the ease of removing a faulty tooth or of substituting a smaller or larger diametered or shorter or longer tine tooth to better suit particular conditions and preferences, and/or for the particular type of lawn mower, is made extremely simple, as well as the fact that the alternately designed tine teeth do not require different types of tine structures — this being a distinct advantage over the Applicant prior and patented invention referred to above. It should be noted that although as illustrated in the drawings and as described as a preferred embodiment, there is a nut that mounts on the threaded bolt shaft extending through the central aperture of the blade to thereby anchor the bolt, it is entirely contemplated and within the scope of the invention for the central aperture itself to be threaded such that the bolt merely screws mateably into the blades tooth-mounting central aperture to thereby anchor the upper terminal end of the tine to the rotary blade.

The invention may be better understood by making reference to the following figures.

THE FIGURES

DETAILED DESCRIPTION OF THE INVENTION

Figure 1:
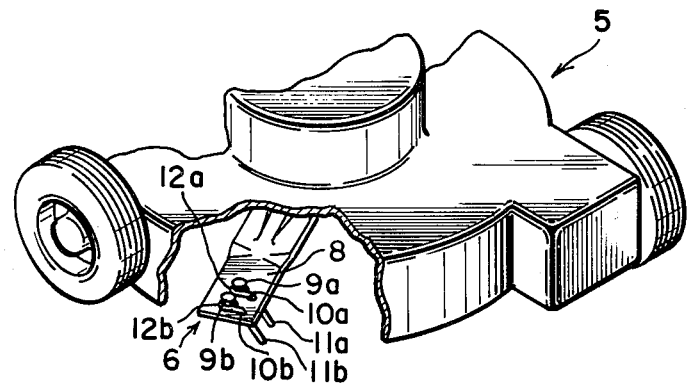
FIG. 1 illustrates a front perspective view, of a typical rotary lawn mower embodying the inventive rotary blade-rake device of the present invention, shown in the partial cut-away of the casing of the lawn mower.
Figure 2:
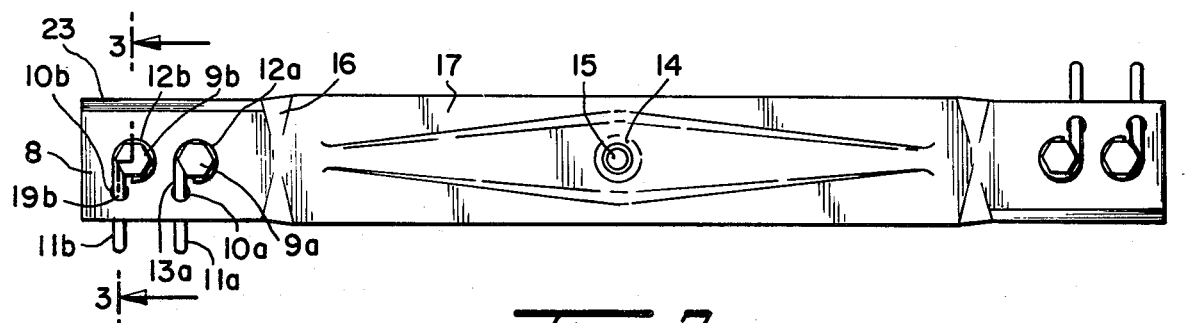
FIG. 2 illustrates a plan view of a preferred embodiment of the rotary-blade and tine tooth-rake device of the present invention.
Figure 3:
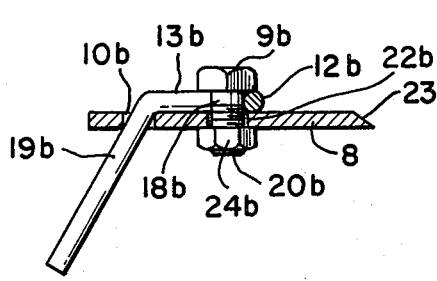
FIG. 3 illustrates an enlarged cross-sectional view as taken along line 3—3 of FIG. 2.
Figure 4:
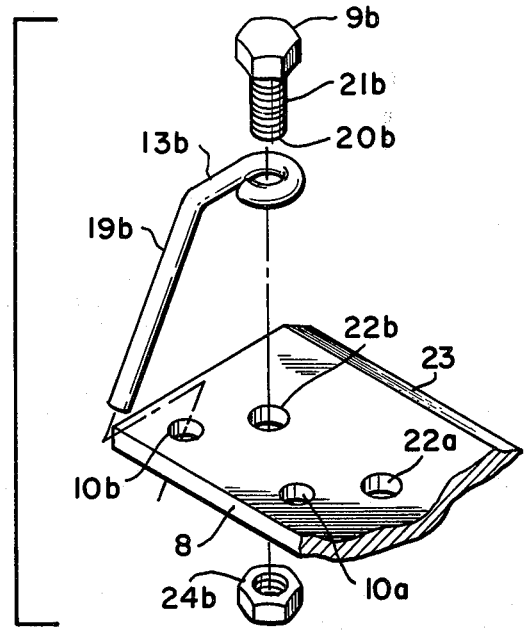
FIG. 4 illustrates an enlarged exploded view of the end portion of FIG. 3.

With regard to the above-noted Figures, and to the invention described in summary above, the illustrated preferred embodiment of FIGS. 1 through 4 includes the inventive combination 6 mounted as a part of the overall rotary mower 5, the combination being shown in its entirety for the invention in the FIG. 2 illustration. The FIG. 2 illustration is discussed hereafter solely with regard to one end of the rotary blade, and in the FIGS. 3 and 4, special emphasis is given to the description of the radially outwardly located rake tine and its mounting blade and bolt and nut structures, other mountings being obviously the same.

In particular, in FIG. 1, the casing 7 is cut-away as a cut-away view in order to better view the inventive structure in its mounted position as the combination 6. The parts described in FIG. 1 are better seen in the subsequent FIGS. 2 through 4 as follow. The blade 17 has an end portion 8 with its leading edge 23 sharpened, and having two pairs of apertures, such as for each pair there being a mounting central aperture 22b (radially outer) and 22a (radially inwardly) respectively, and a trailing blade edge aperture 10b and 10a respectively. The rake tine lower bent portion extends downwardly as tine portion 19b and 19a respectively through the aperture 22b and 22a respectively, with the tine upper portion 13b and 13a respectively extending in parallel and flush with the upper face of the blade and forming an annularly-shaped eye structure 12b and 12a respectively and having the threaded bolt shaft 21b, for example, extending downwardly through the aperture 22b after first extending downwardly through the eye of the eye structure 12b, with the eye structure 12b thereby pinned between the bolt head 9b and the blade 8 upper face by virtue of the nut 24b threadably mounted on the lower bolt end 20b beneath the blade 8 lower surface. The radially outwardly located pair or set of apertures 22b and 10b are lying relative to one-another in parallel to the set of apertures 22a and 10a. Located about mid-way between opposite ends of the blade 8 is an aperture mounting structure 15 defining mounting aperture 14, this being merely typically representative of any desirable or conventional blade mounting structure, this not constituting any inventive aspect of the present invention.

Numerals not specifically discussed correspond to those described, such as 10a corresponding to 10b, and the like.

It is within the spirit and scope of the present invention to make such other modifications and/or substitution of equivalents as would be apparent to a person of ordinary skill in this art.

I claim:

1. A rotary lawn mower rake device comprising in combination: a rotary blade having an integral fixed end portion at each of opposite ends thereof, each end portion having upper and lower substantially flat faces, and spaced about equidistantly between the opposite ends, there being mounting means for mounting the blade on a rotary shaft means for rotation of the rotary blade as a part of a rotary mower, there being at least one pair of apertures spaced-apart from one-another a predetermined distance, each aperture extending between the upper and lower faces for each end portion; for each pair, a tine shaped in a predetermined tine-shape having an upper end portion bent in a direction angularly transversely to a longitudinal axially extending axis of a lower end portion of the tine, and the upper end portion having its terminal end bent in a substantially circular hook-shape defining a through-space with the circularly hook-shaped terminal end extending in a plane substantially parallel to that of the upper portion and substantially transverse to the angularly downwardly extending lower portion; for each pair of apertures, said tine being of a cross-sectional area snuggly inserted angularly downwardly through a first one of the apertures and having the through-space aligned with the remaining second aperture; and bolt means having a threaded shaft inserted through said through-space and mated and secured in said aligned second aperture anchoring said tine on said upper face, the lower end portion of the tine extending through the second aperture and downwardly from said lower substantially flat face.

2. A rotary lawn mower rake device of claim 1, in which said bolt means comprises a headed bolt.

3. A rotary lawn mower rake device of claim 2, in which said bolt means includes additionally a nut means mountable on said threaded shaft on an opposite side of the plate from the head of the headed bolt when the bolt is inserted through the aligned aperture, such that the terminal end of the aligned tine is securable between the upper flat face and the head of the bolt.

4. A rotary lawn mower rake device of claim 3, in which each said pair, apertures are spaced one substantially behind the other in a direction between leading and following edges of the end portion of the rotary blade.

5. A rotary lawn mower rake device of claim 4, in which said remaining one of said pair of apertures, for the mounting of the threaded shaft therethrough, is located about centrally between leading and following edges of the end portion of the rotary blade, and in which the one aperture through which the lower portion of the tine tooth is inserted downwardly is located in juxtaposition to a trailing edge of the end portion of the rotary blade.

6. A rotary lawn mower rake device of claim 5, for each end portion, including at least a second pair of apertures spaced radially inwardly along a length of the rotary blade, the second pair being substantially in parallel relationship to the pair of the other set of apertures and having corresponding second tine and second bolt means mounting the second tine for the second pair of apertures for each of opposite end portions of the rotary blade.

7. A rotary lawn mower rake device of claim 1, in which each of said pair of apertures are spaced one substantially behind the other in a direction between leading and following edges of the end portion of the rotary blade.

8. A rotary lawn mower rake device of claim 1, in which said remaining one of said pair of apertures, for the mounting of the threaded shaft therethrough, is located about centrally between leading and following edges of the end portion of the rotary blade, and in which the one aperture through which the lower portion of the tine is inserted downwardly is located in juxtaposition to a trailing edge of the end portion of the rotary blade.

9. A rotary lawn mower rake device of claim 1, including at least a second pair of apertures spaced radially inwardly of said end portion of the rotary blade for each of opposite end portions, with the second pair being substantially in parallel relationship to the pair of the other set of apertures and having corresponding second tine and second bolt means mounting the second tine for the second pair of apertures for each of opposite end portions of the rotary blade.

* * * * *